United States Patent

Wright

[15] 3,644,928

[45] Feb. 22, 1972

[54] HORIZONTAL SITUATION INDICATOR

[72] Inventor: Jerauld George Wright, Ottawa, Ontario, Canada

[73] Assignee: Her Majesty the Queen in right of Canada as represented by the Minister of National Defence

[22] Filed: Mar. 21, 1969

[21] Appl. No.: 809,358

[30] Foreign Application Priority Data

Mar. 29, 1968 Canada....................................16,257

[52] U.S. Cl....................343/106 R, 340/27 NA, 343/112 R
[51] Int. Cl..........................................................G01s 1/46
[58] Field of Search..............343/112 PT, 106, 107; 340/24, 340/27 NA

[56] References Cited

UNITED STATES PATENTS 2,892,180   6/1959   Smith................................343/107 X Primary Examiner—Rodney D. Bennett, Jr.
Assistant Examiner—Richard E. Berger
Attorney—Smart & Biggar

[57] ABSTRACT

A horizontal situation display instrument, primarily for an aircraft, having a compass card servo driven from a gyrocompass system, a track bar adjustable relative to the compass card and movable therewith and a meter bar arranged to repeat radio bearing information of both geographical bearing and relative bearing.

38 Claims, 4 Drawing Figures

Patented Feb. 22, 1972 3,644,928

INVENTOR
JERAULD G. WRIGHT
By: Smart & Biggar
ATTORNEYS

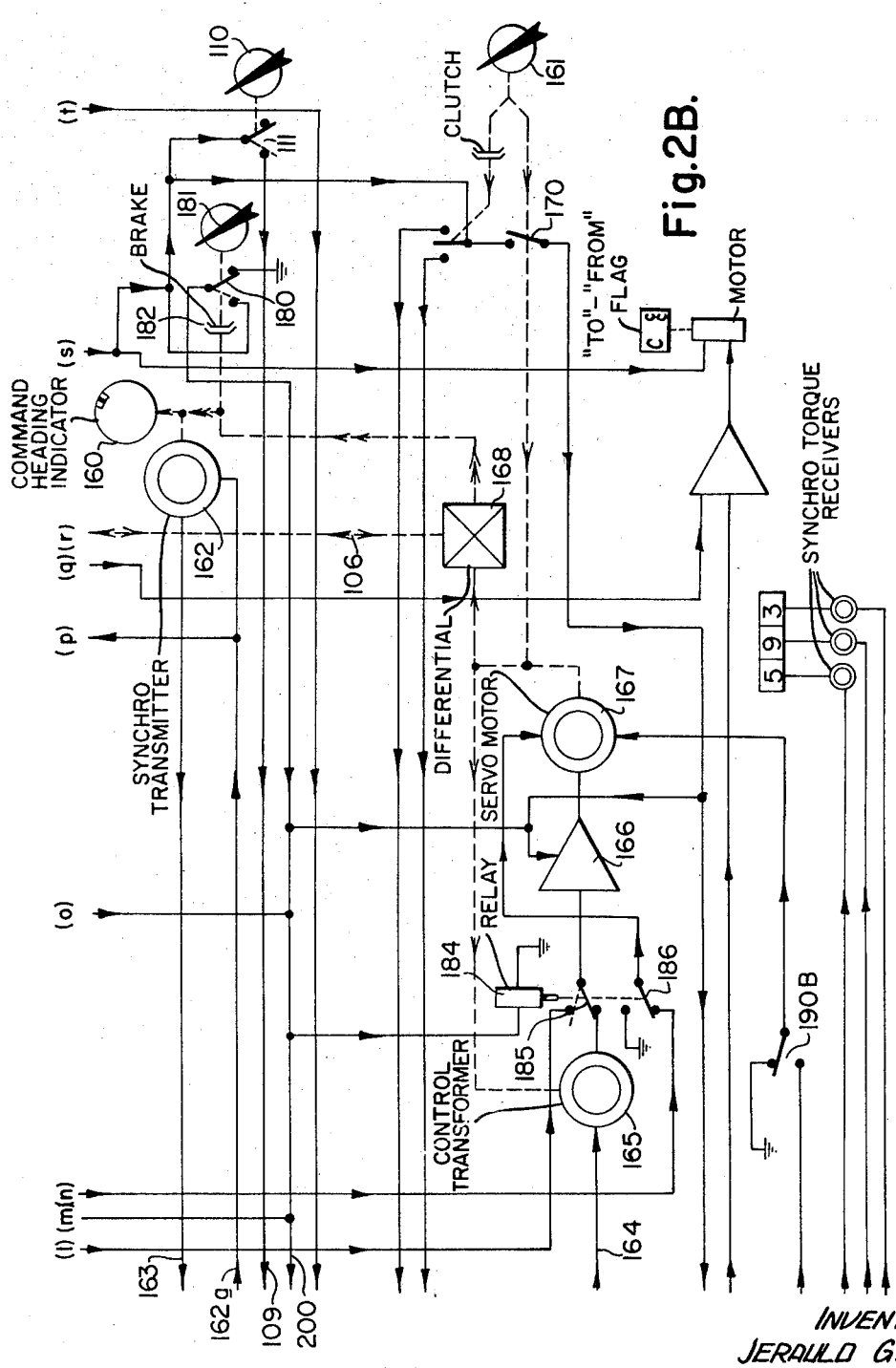

HORIZONTAL SITUATION INDICATOR

BACKGROUND OF THE DISCLOSURE

In prior horizontal situation indicators the pilot of an aircraft was presented on the same dial with a compass repeat, a track bar by which the pilot could set pictorially a desired radial of approach of a radio aid providing a source of geographical bearing (e.g., VOR) and a meter bar which displayed pictorially the instantaneous displacement of the aircraft from the selected radial of approach. Such instruments were useful when the pilot was flying a VOR, Tacan or other geographically oriented range. However the pilot was precluded from coupling relatively oriented devices such as ADF systems to the meter bar. Therefore, he was precluded from pictorially setting up a desired radial of approach to an ADF beacon and flying to that radial on his meter bar.

An object of the present invention is to provide a system capable of giving the pilot a completely free choice of substitution amongst available aids.

This for example provides an immediate advantage that the pilot may be coupled to one form of aid while the copilot is coupled to a different aid. Thus an instantaneous check on the systems may be made.

This and the many other objects of the present invention will become apparent upon a reading of the following summary of the invention, the specification as a whole and the claims.

SUMMARY OF THE INVENTION

According to the invention there is provided a horizontal situation display instrument comprising a compass card, servo means for driving the compass card and means for connecting the servo means to a source of heading data, a track bar adjustable over and relatively to the compass card and once adjusted being movable with the compass card, a meter bar being in line with the track bar when the deviation from track is zero and being rotatable with the track bar at all times and means for connecting the meter bar alternatively, to one or other of at least two radio bearings sources one of which gives relative bearing information and another of which gives geographical bearing information.

BRIEF DESCRIPTION OF THE DRAWINGS

The advantages which accrue from the adoption of such an arrangement and the facilities which are made available will become apparent from the following description.

Embodiments of this invention are illustrated schematically in the accompanying drawings in which:

FIGS. 2, 2A and 2B are sections of a simplified diagram of a second embodiment including more facilities than that of the embodiment illustrated in FIG. 1. In FIGS. 2, 2A and 2B lower case letters are used to simplify the reading of the drawings to indicate the same lines of each section of the circuit.

DESCRIPTION OF THE PREFERRED EMBODIMENTS

Figure 1:
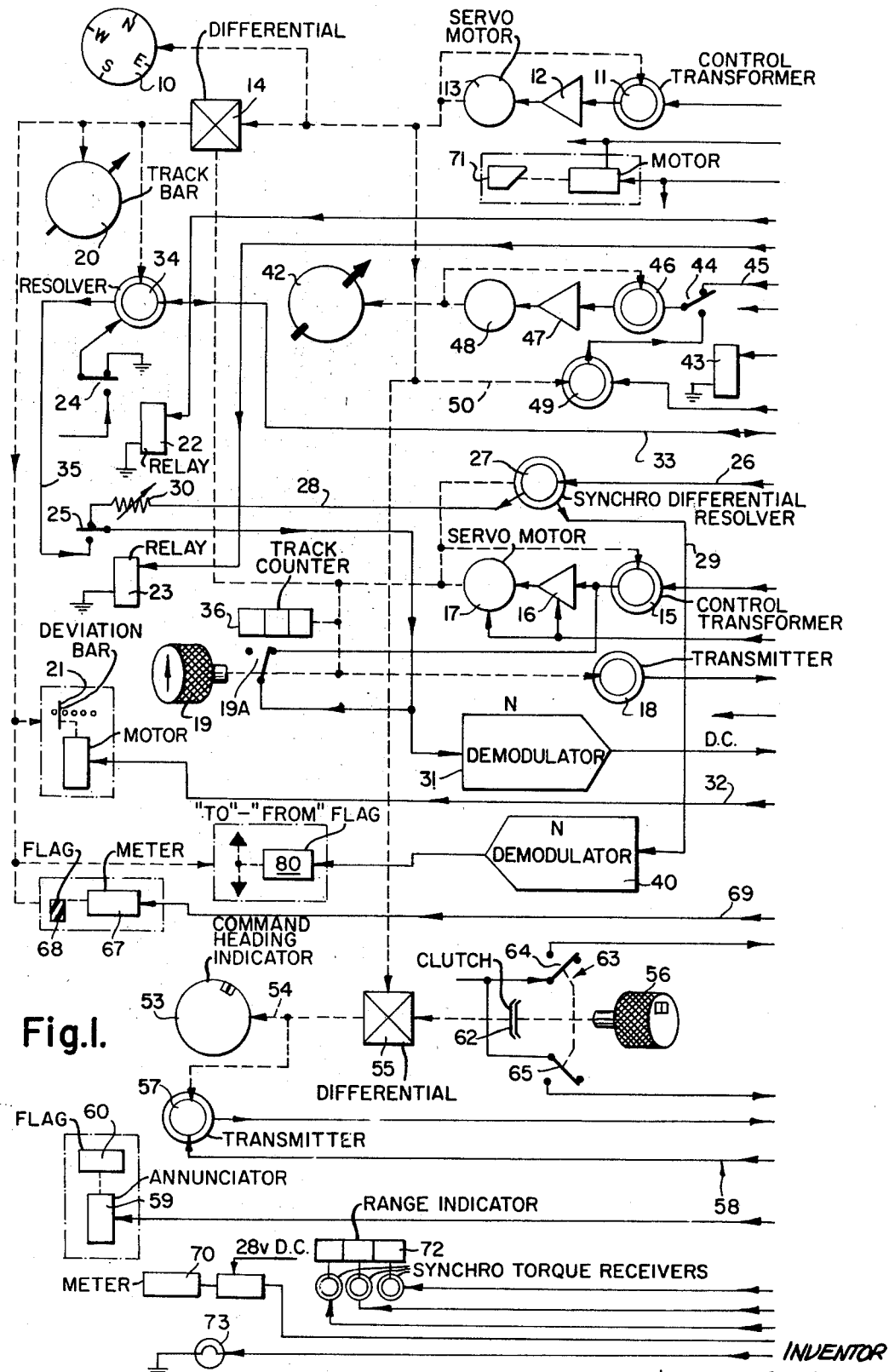
FIG. 1 is a simplified diagram of one instrument.

Referring now to FIG. 1, it will be seen that the instrument includes a compass card which receives its input from a source of heading information through a control transformer 11 which, through an amplifier 12, controls a servomotor 13 upon the shaft of which the compass card is carried.

The compass card also feeds one side of the differential 14 to the other side of which an input is applied directly from the shaft of a track knob 19 or from an external signal source.

The external signal is derived, for instance, from a second similar instrument, the track knob 19 of which is connected electrically to the control transformer 15 of the present instrument through external switching and a synchro transmitter 18 in the second instrument. A signal originated in this way would be applied to control transformer 15 which through an amplifier 16, when that amplifier is excited, for example through a push-pull-type switch 19a on the track knob shaft, actuates a servomotor 17 to drive the track knob shaft and hence the one side of the differential.

It will be appreciated that external switching could be arranged, although this may be considered unnecessarily complex, so that the signal originated in an instrument by the track knob turning the synchro transmitter 18 could be rerouted back to the same instrument so as to turn the track bar by the servomotor 17.

It is also to be appreciated that the signal put out by the transmitter 18 can be applied to various other pieces of equipment within the vehicle.

By applying the output from the differential, which is a combination of the compass card heading input and the track bar commands, to the track bar 20, that bar will move relatively to the compass card when a command track input is applied to it and will thereafter move with the compass card.

The deviation (or meter) bar 21 and the "to-from" flag 80 which is referred to hereinafter, are moved together with the track bar.

A deviation bar 21 is provided on the instrument and in a manner known per se is in line with the track bar when the deviation from the track is nil and is to the left of the track bar when the vehicle has deviated to the right of the track and to the right of the track bar when the vehicle has deviated to the left of the track. The meter bar is fed in one of two ways according to the position of a relay and its contacts 25. With the contacts in the position illustrated in the drawing, the meter bar is fed from a radio signal giving geographical bearing information such as that known as Tacan. The input to the instrument of this geographic bearing information is through line 26 to a synchro differential resolver 27. The differential resolver has a command track input derived either directly from the track knob or from the servomotor 17 if the external method of initiating command tracks is in use. This input acts as a datum and the input from the radio signal is applied also to the resolver. If the inputs are different, a sine output error signal is produced on line 28 and a cosine output error signal is produced on line 29. The sine output is connected to a demodulator 31 through contacts 25 and is taken to the outside of the instrument to be conducted to other equipment within the vehicle (for example the flight director or the auto pilot) and returned to the instrument on line 32, to the meter bar.

The cosine output of resolver 27 is applied, on line 29, to a demodulator 40 and thence to the "to" "from" plug 41 in a manner known per se.

With the contacts 25 of relay 23 thrown from the position shown in the drawings, the meter bar receives its input from a radio source of relative bearing information such as that known as ADF (automatic direction finder).

The source of relative bearing information enters the instrument at terminal 33 and is delivered as an input to the synchro differential resolver 34. The resolver 34 has as its datum input the sum of heading and command track from the shaft upon which the track bar is carried. That input will appear as a rotation of the rotor of the resolver. The addition of the heading input to the resolver 34 as well as the input of track commands converts the relative bearing information to the same terms as the geographical information applied to the resolver 27 so that either of two compatible signals, one originating as a geographic bearing and the other as a relative bearing can be applied to the meter bar.

The resolver 34 produces a sine output on line 35 which is applied to the demodulator 31 and, as in the manner of the signal derived from the geographic bearing information source, to the meter bar. As the cosine signal from a relative bearing source is of no real consequence, (because of the inherent nature of the information derived from that source), it is possible, and may be desirable, to replace the differential resolver 34 by a simple control transformer.

A relay 22 is provided by which the resolver may be connected to an excitation signal, through contacts 24, to operate the resolver as a transmitter to put out signals to the auto pilot and/or flight director.

In known instruments embodying a meter bar difficulty has been encountered by the operator's requirement that there be no apparent parallax effect. A remote pivot for the long lever arm carrying the bar has been used to avoid this effect but of course this takes up space which, particularly in aircraft, is of paramount importance. According to this invention this problem is solved by making the meter bar of such section, that, viewed from any angle, it presents a clear and readable face and has a constant apparent width at right angles to the line of sight rather than, as in the older instruments, the bar being flat and thus presenting a thin edge in certain positions. The preferred section is part cylindrical.

In this way a short arm carrying the bar and moving over a large arc of small radius is quite acceptable to the operator, it will be appreciated that the purpose of the meter bar is primarily not to give an indication of a deviation in any measurable terms but only to indicate a deviation and the direction of that deviation or the absence of a deviation.

Further, it is possible to raise the indicia of the meter, which are usually only dots, upon stalks and arrange that those stalks in the center of the instrument be longer than those towards the edges. In this way the parallax effect is even more reduced.

With the meter bar the only requirement is that there can be derived an indication of whether the vehicle is to the left or right of the track and that it is only in the center of the movement of the meter that accuracy has any real meaning. However, the psychological considerations, particularly for aircraft pilots, are of major concern in the interests of safety and as such this seemingly minor improvement, giving the instrument designer much more latitude and the pilot no distraction, is important.

It is preferred, although in this embodiment it is not illustrated, that the track bar should have the facility of locating the angle of the radio signal source relatively to the aircraft and of course in known instruments this cannot be done automatically. The first of these facilities will of course give the vehicle operator a more readily assimilable picture of where he is relatively to the radial which he is to follow and the value of the second facility resides in its use in giving an immediate cross check of position relative to a particular radio signal source either for the operators use or at the request of a traffic controller.

In both arrangements the facility is provided by applying the track displacement signal, which would normally be applied to the meter bar, to the servomotor 17 so that the servomotor drives the track bar to a position in which the displacement signal is nil, i.e., to a position, using geographic bearing information, in which the track bar will indicate the radial at which the vehicle is currently located and, using relative bearing information, to a position indicating the shortest route to the radio signal beacon.

This arrangement allows that the track bar can be used to present relative bearing information from one source while the bearing indicator can be used to present relative bearing information from a second source. Thus in areas in which Tacan is not available, much navigational and traffic control can be obtained using two relative bearing information sources.

It would be convenient to effect the switching necessary to apply the track displacement signal to the servomotor 17 by providing a push-pull action on track knob 19 to operate switch contacts to redirect the displacement signal to amplifier 16.

As is the usual practice, it is desirable to have a track counter 36 to give an immediate read off of track and this would be connected to the track knob in known manner. To serve as an aide-memoire to the person using the instrument it is proposed that when the instrument is used to locate the current position of the vehicle, the counter 36 be isolated from the servomotor 17 to maintain an indication of the track originally set by the track knob. In this way the onus will not be upon the operator to remember the original track. It will be appreciated that it would be a relatively simple matter to provide that when the track bar is returned to its normal function from that to give the immediate indication of position, it returns to its original setting. To do this one could arrange that the connection between the track knob and track bar be made only through the transmitter 18 and the receiver 15, there being no mechanical connection. Thus if the external connection between the transmitter and receiver were broken by appropriate switching and the displacement signal applied to control the servomotor 17, the track bar would move to point to the radio source, i.e., to the radial on which the vehicle is currently located. If the switching means were then thrown to reconnect the transmitter and the receiver and to remove the servomotor from the control of the displacement signal, the receiver and of course the track bar would return to the originally set track.

It is thought that it would be extremely useful if the track bar and the bearing pointer be normally connected to different types of radio bearing information so that not only is an overall picture of the situation available, which is based upon two independent sources, but also so that, upon operation of the switch to connect the track bar to the track deviation signal an immediate check on the geographic signal known as Tacan is available. This signal is liable to a 30° phase error which would be immediately apparent upon making such a check.

The instrument also includes a command heading indicator 53 which is carried by shaft 54 operable by command heading knob 56. The shaft 54 is connected also to one side of mechanical differential 55 and that differential has an other input the compass card shaft. It is in fact connected directly to the compass card shaft. In this way the command heading indicator is adjustable relatively to the compass card and, once adjusted, moves with that card.

On the shaft 54 is a synchro transmitter 57 which transmits a signal, proportional to the sum of command heading and heading, to the outside of the instrument to be used by other equipment within the vehicle such as the autopilot. A datum excitation signal to the transmitter is applied through a line 58.

The instrument has a known magnetic synchronization annunciator 59 which is controlled in the usual manner externally of the instrument. There is provided on the annunciator a flag 60, instead of the usual "left" "right" marking carries "c" and "cc" markings which are abreviations for clockwise and counterclockwise respectively. The arrangement is such that when the gyroscope input to the instrument is accurate the flag will continuously move between a position in which it shows its "c" marking and a position in which it shows its "cc" marking. When the gyroscope input to the instrument requires correction then one or other of the markings will be shown steadily.

In the past these flags have been marked with a dot and a cross and the correction knob similarly has had a dot, a cross and associated arrows so that when the dot showed continuously the operator would turn the knob in the direction of the dot arrow and similarly when the cross showed he would turn the knob in the direction of the cross arrow.

By having the indication on the flag of the direction in which the knob is to be turned, it is no longer necessary to clutter the knob with these indications and thus frees the knob for display of other information and allows the magnetic heading input correction to be applied by a knob which also controls some other function.

To vary the input to the instrument from the gyroscope, for example by slaving the gyroscope, it is preferred, for the purposes of compactness, to include that control in the command heading knob 56. To do this a shaft of that knob is provided with a clutch 62 which is engaged when the knob is pressed in by a small amount. The engagement of the clutch allows a three-position switch 63 to be operated. In the position with the clutch disengaged the situation is as shown in the drawing but when the clutch is engaged by pressure on the knob 56 then either contact 64 or 65 can be made by turning the knob clockwise or counterclockwise respectively thus to make a circuit to vary the gyroscopic input either to right or to left.

It will be appreciated that there is a risk of the clutch being inadvertently engaged whilst a command heading is being set but as the corrections are made very slowly, during the short period of making the heading command only a very small change could be cranked into the system. In any event the "c" "cc" flag would quickly show any major deviation and a slaving loop would eliminate it automatically. Such a loop is shown and described in the embodiment of FIG. 2.

The instrument has in a known manner, a meter 67 receiving an input through contact 69 from the vehicle's radio bearing signal receiving apparatus to give an indication of the reliability of the radio signal. The meter controls the position of a flag 68 in the usual fashion. There may also be a meter and flag 70 indicating that the Tacan range signal is reliable.

There is provided the usual power on-off flag 71 and a range indicator 72. The instrument is of course illuminated as by bulbs 73.

Figure 2:
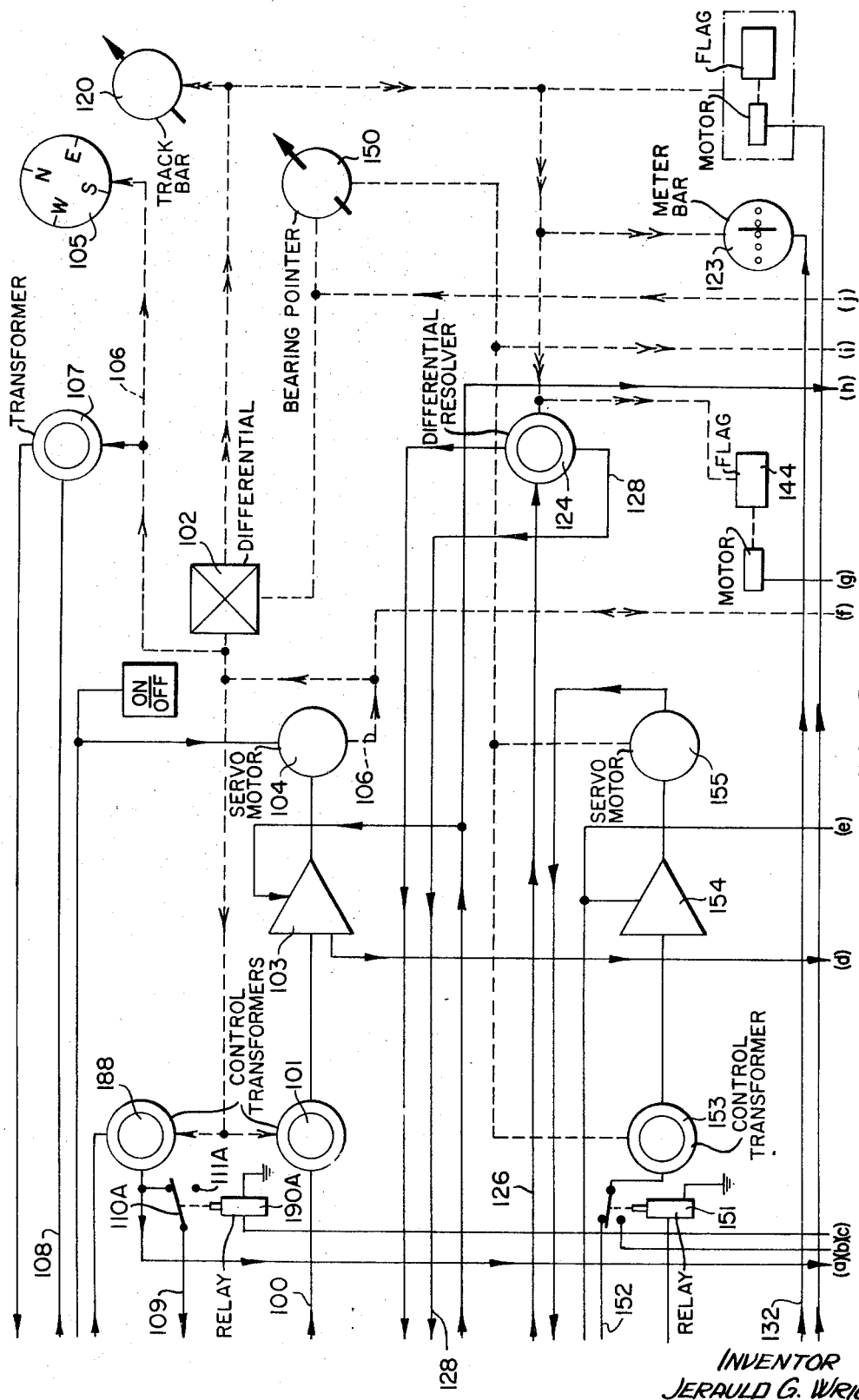

In FIG. 2 there is illustrated a rather more sophisticated embodiment of the invention than that shown in FIG. 1 but there are many parts which are common to both embodiments and in consequence they are described only very briefly.

There is, in the normal mode, as in the embodiment of FIG. 1 an input of heading information through line 100 through a control transformer 101 which controls, through amplifier 103, a servomotor 104. The output shaft 106 of the servomotor is connected directly or through a geared drive to the compass card 105. The output shaft of the servomotor is also connected to one side of a mechanical differential 102. The other side of the differential receives an input of command track from track knob 113 in much the same manner as has been described in detail in connection with FIG. 1 and the combined output of command track and magnetic heading is applied to the track bar 120. The servomotor 104 also comes under the influence of a control transformer 107 which derives an input from the magnetic flux detector of the vehicle through line 108 to correct, through a slow-acting loop in the external compass system, the compass card for apparent gyroscope or other heading, error.

Externally of the instrument the flux valve amplifier output is connected through lines 109, to a push-pull-type switch 110A with contacts 111A to place the gyroscope input under the influence of the flux valve control transformer 107 or to remove that control.

As in the embodiment of FIG. 1 the command track knob 113 controls a synchro transmitter 114 which transmits a signal to the outside of the instrument to line 115. That output signal can be applied to a similar instrument and, similarly the output from such an instrument can be applied to this instrument. In that event the signal is passed to line 116 to be applied to the control transformer 117 which controls through amplifier 118 a servomotor 119, the output shaft of which is connected to that side of the differential 102 opposite to the shaft of servomotor 104. The connection between the control transformer 117 and the amplifier 118 is made externally of the instrument through switching between lines 117a and 140. The combined differential output is then applied to the track bar 120 so that the track bar can be adjusted relatively to the compass card 105 and thereafter moves with that card.

The meter 123 is controlled in similar fashion to that of FIG. 1, by the sine outputs from either one of differential resolvers 124 or 125. The resolver 124 receives inputs of command track from the track bar shaft on the track bar side of differential 102, and of a radio signal giving relative bearing information on line 126. The resolver 125 receives command track information input directly from the shaft of servomotor 119, i.e., from the servomotor side of the differential, and a radio signal giving geographic bearing information through line 127.

The switching to select whether geographical or relative bearing information is to be used on the meter bar is made externally of the instrument.

The sine output of resolver 124 is taken to the outside of the instrument to contact 128 and the sine output of resolver 125 taken to the outside of the instrument at contact 129. Either of these signals is returned, through appropriate switching to the track deviation demodulator 133, through contact 130, the demodulated signal is then taken to the outside of the instrument at contact 131, returned to contact 132, after, if need be, being applied to other equipment within the vehicle, and applied The feature of utilizing the track bar to obtain an indication of the current position of the vehicle, which was discussed with reference to the embodiment of FIG. 1 but not illustrated in that figure, is embodied in the arrangement now under consideration and functions in the same fashion as that described with reference to FIG. 1.

THe track error signal on lines 128 or 129 can alternatively be connected through appropriate switching to be returned to the instrument at line 140 and the undemodulated applied to amplifier 118 to control servomotor 119 and cause the track bar to be turned until the meter bar is in a null position, i.e., until the track bar when the meter bar is operating on a relative bearing input, points directly to the bearing information source, or when the meter bar operates on a geographic bearing input, indicates the radial at which the instrument is currently located. Such a connection is an alternative to the normal connection of line 117a and line 140.

The command track knob is connected to a counter 142 which gives an immediate read off of the track set on the track bar and it is possible that when the track bar is utilized to obtain a current position indication, that the connection between a command track input and the counter be omitted as at 142a so that the counter would act as an aide-memoire for the pilot to return to the track setting originally made. This could be effected by connecting, through external switching line 115 to line 140 so that the servomotor 118 comes under the control of synchro transmitter 114.

As in the embodiment illustrated in FIG. 1, the cosine output on lines 143 of the differential resolver 125 is used to control the to-from flag 144. A cosine output is taken to the exterior of the instrument at line 143 to be distributed to other equipment within the vehicle and returned to the instrument at 146 to be passed to a to-from signal demodulator 147 whence on line 148 it is passed to the motor of the to-from flag 144.

A cosine signal could of course be derived from the resolver 124 and put to the same purpose as that of the resolver 125 but its valve is not so pronounced when using a relative bearing orientated track and for this reason could be omitted from this embodiment. The resolver 124 could be replaced by a control transformer.

The bearing pointer 150 of this instrument is operable in two ways according to the position of the contacts of relay 151. With those contacts in the position illustrated, relative bearing information is applied directly through a relative bearing radio signal introduced to the instrument at terminals 152. That signal is applied to a control transformer 153 which, through amplifier 154 controls servo motor 155 upon the shaft of which the bearing pointer 150 is located.

In the other position of the contacts of the relay, a signal derived from a source of geographical bearing information is connected to terminals 158 and applied to the windings of a differential synchro element 159, the rotor of which is directly connected to the shaft 106 of the servomotor 104. An output signal is thus derived from the element 159 which is proportional to the geographic bearing input and the heading of the vehicle, i.e., which is similar to a relative bearing signal. This output is then applied to the control transformer 153 to control the operation of the servomotor 155 and hence the position of the bearing pointer 150.

The instrument has a command heading indicator 160 operable by command heading knob 161 in the manner herein described or from some external source.

The knob 161 is connected to the command heading indicator 160 through a mechanical differential 168 to the other side of which compass shaft 106 is connected, and carries a synchro transmitter 162, which is excited from powerline 162a and/or a transmitter/receiver which transmits relative command heading to the exterior of the instrument on line 163 whence it may be applied to other equipment within the vehicle, or if synchro 162 is a transmitter/receiver, to an instrument similar to the one under consideration. It will be appreciated, by one skilled in the art, that when the synchro is a transmitter/receiver element, the error signal can be applied by appropriate switching means, to amplifier 166 to control the command heading indicator, bypassing control transformer 165 and powerline 162a.

An externally generated command heading signal can be applied to the instrument under consideration on line 164 to control transformer 165 which controls, the amplifier 166, and servo motor 167 which is connected, through differential 168 to the command heading indicator 160. The excitation signal for the amplifier 166 is applied through contact 170 which are made or broken according to the position of the command heading knob. To make or break these switches the command heading knob has a push-pull action and in the position in which the contacts are made, to excite the amplifier, that knob is arranged to be pulled and thereby establish the desired signal path. The knob spindle can be painted, to indicate that the command heading indicator is under the control of an external source. Optionally, and this is described in more detail hereinafter, an excitation current to the amplifier can be applied through switch 180.

The magnetic slaving button 110 controls the switch 111 to provide magnetic slaving of the input to the compass card and it is desirable that that button be ganged to what is termed herein the X-mode button 181.

The X-mode is an emergency mode which upon actuation substitutes for many of the parts of the instrument, different elements, to maintain in the event of a failure, most of the facilities of the instrument. When the X-mode button is pressed the amplifier 166 receives an excitation signal through the switch 180, and a brake 182, which may be in the form of a pawl acting on the mechanical transmission between the differential 168 and the command heading indicator, is engaged to lock the indicator side of the differential 168.

The relay 184 and its contacts 185 and 186 respectively are thrown to put the amplifier 166 under the control of a reserve control transformer 188 which receives a standby magnetic heading input, usually from a second source within the vehicle. The contacts 185 and 186 also break the connection between the control transformer 165 and the amplifier 166. In this way with the amplifier 166 under the control of the control transformer 188 the servomotor 167 is also brought under the control of the standby source of magnetic heading information and as the differential 168 is locked, the shaft 106 applies that servomotor output to the compass card to maintain that facility. In this way all the facilities which depend upon the magnetic heading input are maintained. Thus a breakdown in the control transformer 101, the amplifier 103, the servomotor 104 can readily be accommodated and the only facility which is lost is the command heading indication.

When the X-mode button is thrown a signal appears on line 200 and is taken to the exterior of the instrument and also serves to energize relay 190a to apply the output of control transformer 188 to the contact 185 of relay 184.

Relay 190a controls contacts 190b to connect the circuit to an alternative power source. In this way a breakdown in the power source is also accommodated and for technical reasons reverses the polarity of the power phasing to the motor 167.

The relays controlling X-mode operation could readily be replaced by a mechanical switch operable directly by the X-mode button.

It is to be noted that the servomotor 167 is more powerful than servomotor 104 or has appropriate gearing, so that while the compass card movements are slower in X-mode than in the normal mode, the servomotor 104 need not be disconnected from the shaft of the compass card.

It will be appreciated that the instruments described herein provide many advantages. The arrangement of X-mode described with reference to the second embodiment of the invention provides that the vital compass card servo loop is completely duplicated and a completely separate system is on standby ready to take over the task of driving the compass card and at the same time that the parts forming the standby are not in themselves redundant inasmuch as they play a part in the operation of the instrument during normal functioning.

Further, by the arrangement described, the instrument provides but single load upon the gyro and/or the compass system as opposed to the several loads which have been required in the past to maintain a system which does not have the advantages of the present system. This is achieved by arranging the instrument so that a heading input to each of the Tacan or VOR sets is not required and so that Tacan or VOR radio coupling and the pilot-select facility to the autopilot do not add to the compass loads. In known systems these requirements mean that each instrument has three synchro transmitters coupled to the gyrocompass output and that each Tacan or VOR set adds extra loads to the gyrocompass. By taking the outputs of the mechanical differentials and applying them to the auto pilot and to the flight director one does away with the requirement for extra compass inputs and of course with the considerable and complex wiring required to drive these inputs and to eliminate the phase synchronism required.

Also at first glance the instrument according to this invention would appear to have the same bearing-distance indication capability as other instruments. This is not the case. Other instruments operate in such a fashion using four-phase resolvers that only one indicator can be meaningfully coupled to one source of geographic bearing information. This occurs because there is a multipass connection between the instrument and the source of information such that both units are completely tied up when a radial is selected for the instrument. The angle selected on the instrument is transmitted to the geographical bearing information source, there is compared with the actual position of the vehicle relative to the source, the error is amplified in the particular instrument for receiving the information again to the horizontal situation indicating instruments. Thus it makes pictorial sense only on the horizontal situation indicator upon which the selection has been made. Further a great number of wires pass back and forth between the horizontal situation indicator and the radio aid by which the source of bearing information is received and of course if it is required to provide a standby (X-mode) facility then all of these wires must be switched.

Figure 2A:
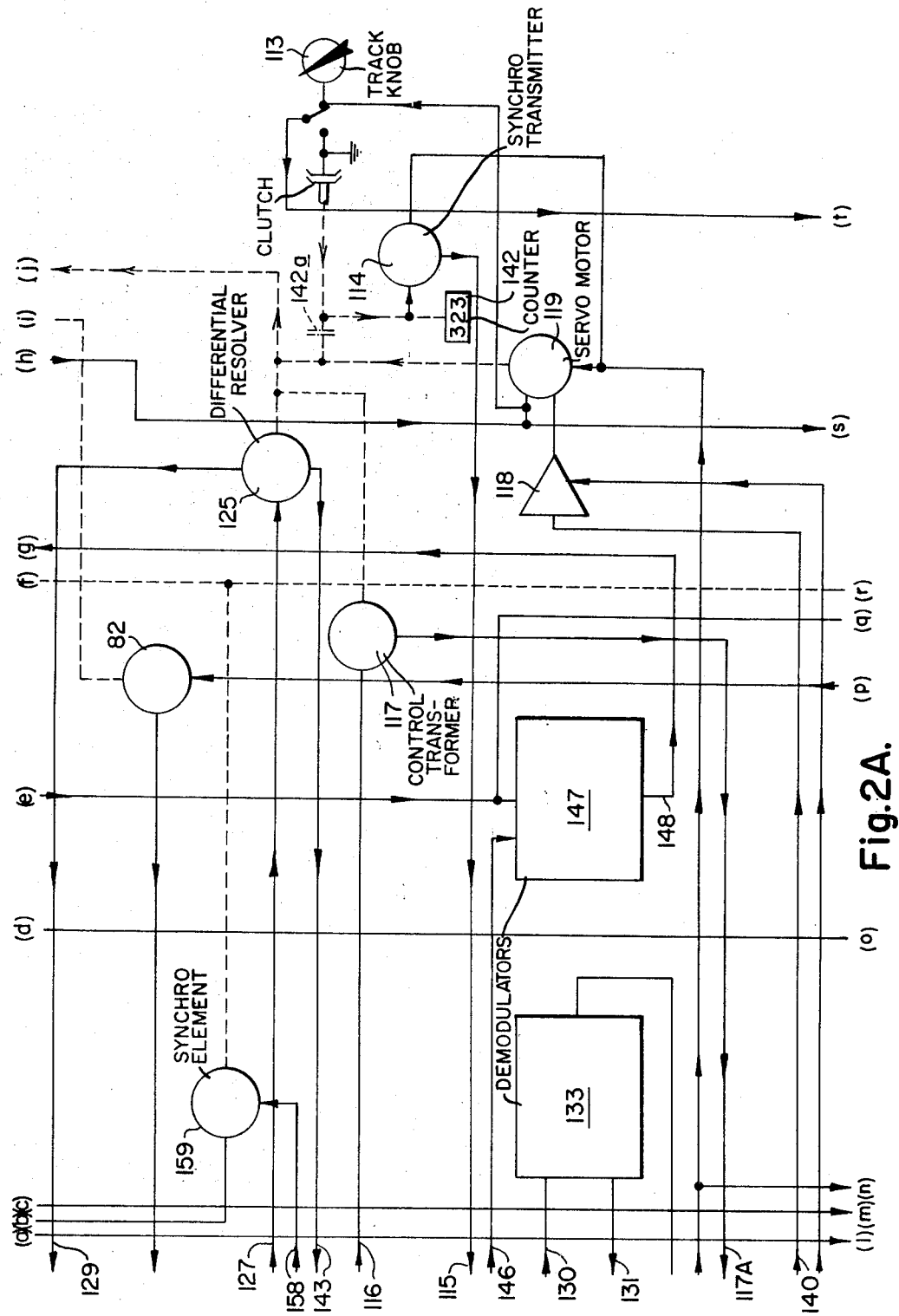

By the adoption of the present arrangement both relative and geographic signals can be accepted interchangeably for identical presentation on any of the appropriate horizontal situation indicator instruments as no four phase resolver connection is required, and that in this way one can utilize the pictorial display capability provided by the track deviation meter for either type of source and motor. Also since three-phase synchros are used rather than four-phase synchro resolvers, it is possible to apply the error signals of those synchros which are compatible with such amplifiers as 118 in FIG. 2A, to drive appropriate servo loops in the manner described with reference to the drawings.

It is convenient to present the information derived from this instrument upon a dial which is standardized in the art so that a pilot familiar with old instruments will experience no real difficulty in converting to the new instrument.

It will be appreciated by the skilled engineers in this art that there are many advantages which accrue from the adoption of the arrangements as herein described and claimed.

What I claim as my invention is:

1. A horizontal situation display instrument comprising a compass card, servo means for driving the compass card and means for connecting the servo means to a source of heading data, a track bar adjustable over and relatively to the compass card and once adjusted being movable with the compass card, a meter bar being in line with the track bar when the deviation from track is zero and being rotatable with the track bar at all times and means for receiving and applying to the meter bar, alternatively, one or other of at least two radio bearing information sources one of which gives bearing information as an angle relative to aircraft heading and another of which gives bearing information as an angle measuring with respect to a ground datum and independent of aircraft heading, the signal for controlling the meter bar being produced from one of two signals derived from a differential device located within the instrument.

2. An instrument according to claim 1, in which said source of geographical bearing information is that known as Tacan.

3. An instrument according to claim 1, in which said source of geographical bearing information is that known as VOR.

4. An instrument according to claim 1, in which the source of relative bearing information is that known as ADF (automatic direction finder).

5. A horizontal situation display instrument according to claim 1, wherein to derive a signal from the differential resolver from a source of relative bearing information and to render the signal compatible with the alternative input to the meter bar, heading information and bearing information are mixed and applied as an input to the resolver.

6. A horizontal situation display instrument as claimed in claim 1, in which the track bar is adjustable by operation of a servomotor, said motor being selectively operable by a transmitter remote from the instrument and actuable by a crew member as well as being operable from the instrument itself.

7. An instrument as claimed in claim 1, wherein there is provided a transmitter/receiver element selectively receiving or transmitting relative bearing data, to receive and apply bearing data to the track bar and to transmit bearing data to other equipment within the vehicle.

8. An instrument as claimed in claim 1, including a first servomotor for driving the compass card and a second servomotor for selectively driving the compass card or some other movable part of the instrument.

9. An instrument as in claim 8, in which said second servomotor is sufficiently powerful to turn the first servomotor and the compass card.

10. An instrument as in claim 8, in which the second servomotor is connected to the compass card shaft through gearing to enable the second motor to turn the first motor and the compass card.

11. An instrument as in claim 8, in which the second servomotor is connected to the other movable part of the instrument through a mechanical differential to one side of which the compass card is connected.

12. An instrument as claimed in claim 11, in which to cause the second servomotor to drive the compass card that side of the differential to which the other movable part of the instrument is connected, is locked.

13. An instrument as claimed in claim 8, in which that other movable part is a command heading indicator.

14. An instrument as claimed in claim 8, in which the servomotors are controlled by the outputs of respective first and second amplifiers and said second amplifier being selectively connected to a source of magnetic heading information or to a source of information to be indicated by the other movable part of the instrument.

15. An instrument as claimed in claim 14, in which the source of magnetic heading is a standby heading input.

16. An instrument as claimed in claim 14, in which the second amplifier is connected to the source of magnetic heading information through a control transformer.

17. An instrument as claimed in claim 8, comprising a first servomotor, a first amplifier and a first control transformer for receiving a magnetic heading input; a second servomotor, a second amplifier and a second control transformer for receiving data to drive another movable part of the instrument; a third control transformer for receiving a magnetic heading input and selecting means for connecting the second amplifier alternatively with the second control transformer or the third control transformer, said second servomotor being connected to the compass card when the third control transformer is connected to the second amplifier.

18. An instrument as claimed in claim 17, in which the second control transformer receives an input of command headings.

19. An instrument as claimed in claim 18, in which the command heading indicator is connected to the second servomotor through a mechanical differential the other side of which is connected to the compass card and said selecting means operate to lock the command heading indicator side of the differential.

20. An instrument as claimed in claim 1 with a first receiving element having a magnetic heading input and a relative bearing information input; second receiving element having an input of geographical bearing information and switching means operable to connect one or other of the receiving elements to the meter bar.

21. An instrument as claimed n claim 20, in which the first receiving element is a control transformer the rotor of which receives a combined input of a command track and heading.

22. An instrument as claimed in claim 20, in which the first receiving element is a differential resolver the rotor of which receives a combined input of a command track and heading and the sine output of which is connected to the meter bar.

23. An instrument as in claim 21 in which said receiving element is adapted to be connected to the meter bar through external circuitry.

24. An instrument as claimed in claim 1, in which the track bar is alternatively rotatable relatively to the compass card through a mechanical connection with a command track knob and by a servomotor operable from externally of the instrument.

25. An instrument as in claim 24 in which the mechanical connection between the command track knob and the track bar includes a signal transmitting element the output of which is to the exterior of the instrument.

26. An instrument as claimed in claim 25, in which a signal receiving element adapted to receive signals from the transmitting element controls operation of the servomotor.

27. An instrument as claimed in claim 24, including switching means to place the servo motor under the control of the track error signal to the meter bar.

28. An instrument as claimed in claim 24, including a signal receiving element and an amplifier for controlling the servomotor and switching means operable to disconnect the receiving element from the amplifier and to feed to the amplifier, the track error signal.

29. An instrument as claimed in claim 25, including a track counter wherein said switching means, when operated to connect the amplifier to a source of track error signal, disconnects the counter and the track bar.

30. An instrument as claimed in claim 1, in which the track bar is movable relatively to the compass card by a servomotor, said servomotor being controlled by an amplifier and a signal receiving element.

31. An instrument as claimed in claim 30, including a track knob and a signal transmitting element, said element being connectable, through external circuitry with the receiving element.

32. An instrument as claimed in claim 31, including means for selectively connecting the receiving element to the amplifier and a source of track error signal to the amplifier.

33. A horizontal situation display instrument comprising a compass card, a servo loop including a receiver element for heading information, an amplifier and a servomotor; a second servo loop for driving some other movable part of the instrument ans including a servomotor ans switching means for selectively connecting the servomotor of the second loop to the other movable part or to the compass card, the servomotor of the second loop being sufficiently powerful to turn the first loop and the compass card.

34. A horizontal situation display instrument as claimed in claim 33 wherein there is provided a second receiver element for receiving heading information, and a receiver element for information to be applied to the other movable part of the instrument said switching means adapted to selectively place servo loop under the influence of the second heading information receiver element or the receiver element for receiving information to be applied to the other movable part of the instrument.

35. An instrument as claimed in claim 33 in which the servomotor of the second servo loop is connected to he compass card shaft through gearing to enable it to turn the first loop and the compass card.

36. An instrument as claimed in claim 33 in which the second servomotor is connected to the other movable part of the instrument through a mechanical differential to one side of which the compass card shaft is connected.

37. An instrument as claimed in claim 36 having locking means associated with that side of the differential to which the other movable part of the instrument is connected so that with that lock operative the drive from the second loop is applied to the compass card.

38. An instrument as claimed in claim 33 in which the other movable part of the instrument is a command heading indicator.

* * * * *